L. BAILEY.

Bench-Plane.

No. 6,498.

Reissued June 22, 1875.

Witnesses.

John H. Witting

Frank G. Fischer

Inventor.

Leonard Bailey

By Wm. E. Simonds

Atty.

UNITED STATES PATENT OFFICE.

LEONARD BAILEY, OF NEW BRITAIN, CONNECTICUT.

IMPROVEMENT IN BENCH-PLANES.

Specification forming part of Letters Patent No. 67,398, dated August 6, 1867; reissue No. 6,498, dated June 22, 1875; application filed June 13, 1874.

*To all whom it may concern:*

Be it known that I, LEONARD BAILEY, of New Britain, in Hartford county, Connecticut, have invented certain new and useful Improvements in Bench-Planes, of which the following is a specification, reference being had to the accompanying drawings, where—

Figure 1:
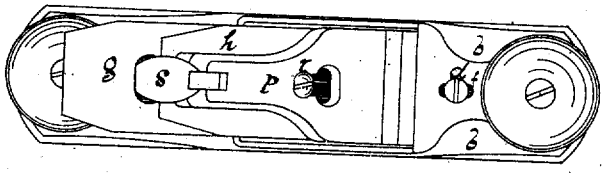
Figure 2:
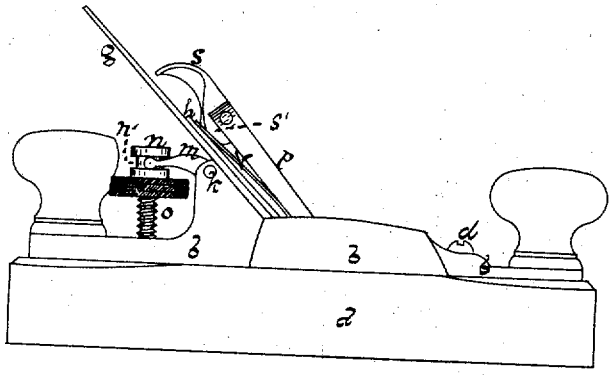
Figure 3:
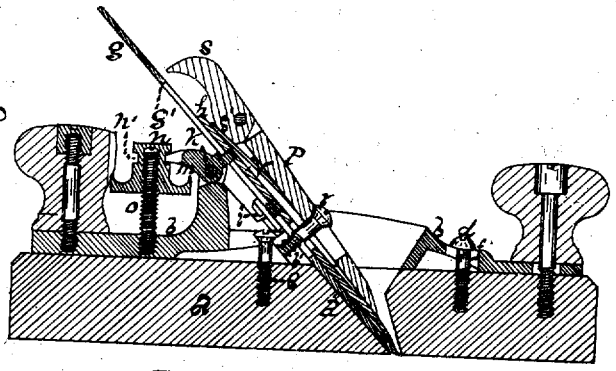
Figure 4:
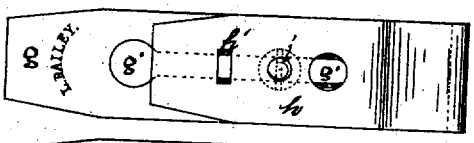
Figure 5:
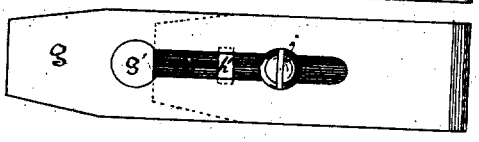

Figure 1 is a top view of a plane embodying my said improvements. Fig. 2 is a side view of the same. Fig. 3 is a view of the same in central vertical longitudinal section. Fig. 4 is a detail face view of the plane-iron and the cap-iron as united. Fig. 5 is a detail back view of the plane-iron and the cap-iron as united.

The invention has two features, and consists in, first, so combining the two parts which go to make up the body or stock of the plane, that they may be firmly secured together, and yet may be adjusted longitudinally one upon the other, to compensate for unequal wear upon the two parts; second, in a screw-adjusting device for adjusting the edge of the plane-iron to its work, which operates upon the plane-iron through the medium of the cap-plate or cap-iron, and in such manner that the relations of the adjusting device and the cap-plate are constant and always the same, while the relations of the adjusting device and the plane-iron will change as the plane-iron wears away by use.

The stock or body of the plane is in two parts, *a* and *b*, both having the throat *c* for the plane-iron. The lower part *a* may be of wood, and the upper part *b* of metal. They are connected or kept together by the screws *d e* running through the slots *f* into the base *a*, the slots *f* serving to permit the longitudinal adjustment of the part *b* upon the part *a*. This longitudinal adjustment is for the purpose of permitting the adjustment of the throat-bed $b^1$ in the part *b*, so that it shall be flush with the throat-bed *a'* in the part *a*, both when the plane is first made and afterward when these throat-beds become unequally worn. The letter *g* indicates the plane-iron having the centrally-located longitudinal slot or mortise *g'*. The letter *h* indicates the cap-iron secured to the plane-iron by the clamp-screw *i* running through the mortise *g'* into the cap-iron. This cap-iron has near its upper end, and overlying the mortise *g'*, the mortise *h'*. On the pivot-pin *k* is hung the lever *m*, one end entering into and fitting in the mortise *h'*, and the other bifurcated end taking into the annular groove *n'* in the thumb-nut *n*, traveling on the screw-pin *o*. When the thumb-nut *n* is run down upon the screw *o*, the cap-iron and the plane-iron are moved upward and backward, and when the nut *n* is run up on the screw *o*, the cap-iron and the plane-iron are moved forward and downward, thus permitting the adjustment of the plane-iron to a desired depth of cut with the utmost nicety.

It is very easy to adjust the plane-iron and the cap-iron by this my present plan. The edges of the two irons are made to about coincide, the screw *i* tightened, the two irons set in place, so that one end of the lever *m* enters the slot *h'*, and then, by means of the nut *n* running on a short screw, *o*, the plane-iron can be adjusted with any required degree of nicety; and the adjusting device and cap-iron work in just the same way till the plane-iron is used up, and will outlast almost any number of plane-irons.

It is to be readily seen from the foregoing description that the gist and essence of this feature of my invention is the use and application of a screw or its equivalent for adjusting the plane-iron, acting mediately through or in consonance with the plate *h*, the relations of the adjusting device and such plate remaining constant, while the relations of the adjusting device and the plane-iron vary as the length of the plane-iron decreases by use and wear. Of this principle I believe myself to be the first discoverer, and the first inventor of a means for putting it into practical operation and use.

In order to aid in depressing the heel of the fastening-lever *p* from the head of the screw *r*, as well as to afford a means of aiding in throwing up the cam-lever *s*, and to enable the cam *s'* of such lever to turn without friction on the cap-iron, I affix to the bearer or lever *p*, on its under side, a spring-plate, *v*, it being arranged with the bearer *p* and its lever *s* in manner as represented.

And I claim as my invention—

1. The combination and arrangement of the two parts *a b* of the stock together by means of the clamp-screws *d e* running through the slots *f*, as described, whereby such parts may be adjusted with reference to each other and clamped together, as and for the purpose specified.

2. The combination of the screw *o*, nut *n*, lever *m*, and the plane-stock, substantially as described.

3. The combination of the nut *n*, lever *m*, and plate *h* with the plane-iron, substantially as described.

4. The combination of the plane-iron, plate *h*, and lever *m*, substantially as described.

LEONARD BAILEY.

Witnesses:
WM. E. SIMONDS,
JOHN HENRY BROCKLESBY.